Figure 1:
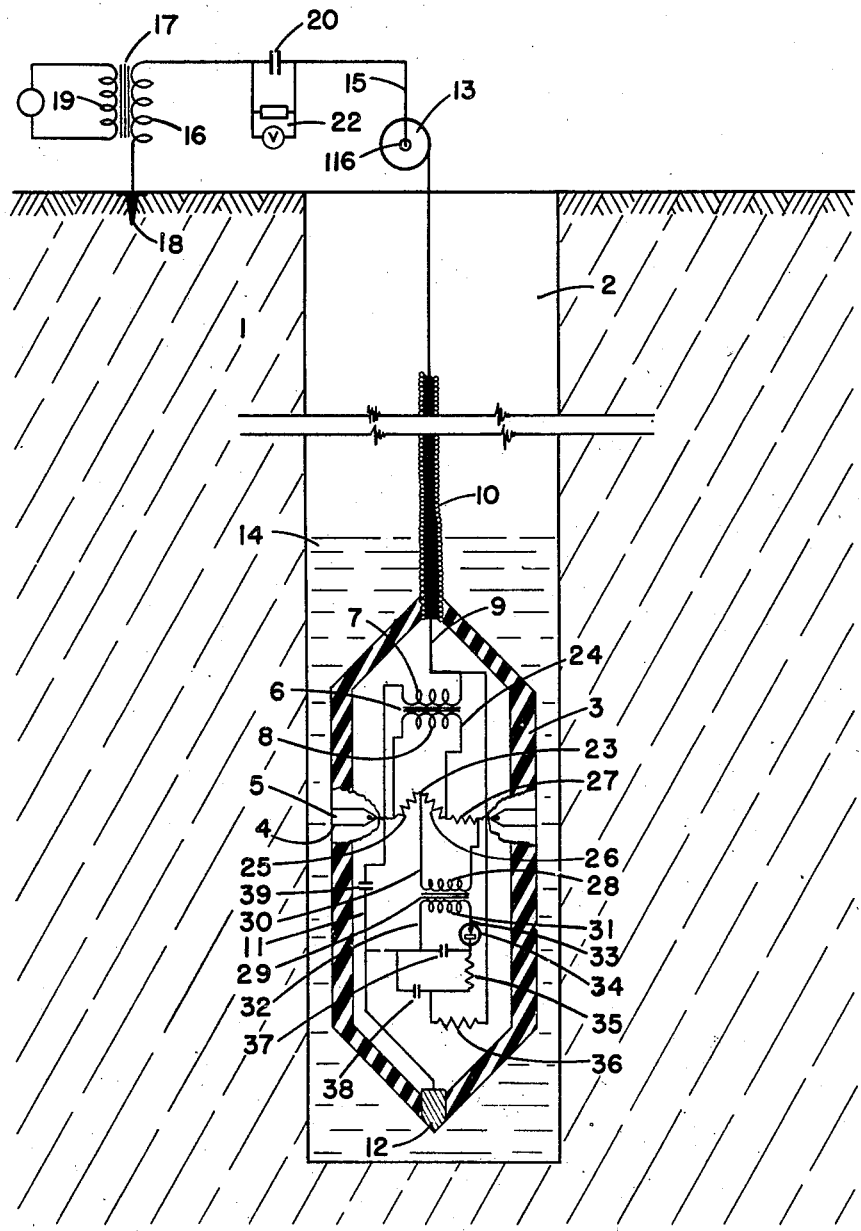

March 30, 1943. W. D. MOUNCE 2,315,127
RESISTANCE THERMOMETER
Filed Oct. 12, 1939 2 Sheets—Sheet 1

Whitman D. Mounce INVENTOR.
BY P. L. Young ATTORNEY.

March 30, 1943.  W. D. MOUNCE  2,315,127
RESISTANCE THERMOMETER
Filed Oct. 12, 1939  2 Sheets-Sheet 2

Whitman D. Mounce INVENTOR.

BY P. L. Young ATTORNEY.

Patented Mar. 30, 1943

2,315,127

UNITED STATES PATENT OFFICE 2,315,127

RESISTANCE THERMOMETER

Whitman D. Mounce, Houston, Tex., assignor to Standard Oil Development Company, a corporation of Delaware Application October 12, 1939, Serial No. 299,066

6 Claims. (Cl. 73—362)

This invention is directed to an electrical bore hole thermometer.

It is an object of the present invention to provide an accurate thermometer which may be used to obtain bore hole temperatures at a rapid rate.

It is a further object of the present invention to provide a bore hole thermometer which can be used to indicate the points in a bore hole at which deviation from the temperature gradient occurs.

It is another object of the present invention to provide a bore hole thermometer in which power may be supplied to the measuring unit in the form of alternating current and in which direct current provides the temperature indication.

In my copending application Serial No. 167,965 I have disclosed an electrical bore hole thermometer in which a bare conductor of low heat capacity is used as the measuring unit. This measuring unit is connected to a transformer which, in turn, is electrically connected to a source of alternating current by a circuit containing a cable, so that the measuring unit may be lowered into a bore hole while the source of current remains at the surface of the earth. Changes in temperature of the measuring unit cause changes in the impedance of the alternating current circuit and so enable an indication of the temperature of the measuring unit to be obtained at the surface of the earth.

While the thermometer described in my copending application has a high sensitivity, low heat capacity and high thermal conductivity, there are limits to its usefulness. Due to the fact that transformers otherwise suitable for use in this device have temperature coefficients comparable to that of the measuring element in addition to a high heat capacity and a low thermal conductance compared to that of the element, serious errors in the measurement of the actual temperature result. This occurs as a drift in the recorded measurement. In addition, when the instrument is used at high sensitivity on a single conductor cable, small variations of impedance of the return circuit introduce errors not as a steady drift, but in the form of variations which may appear to be abrupt changes in temperatures.

The present invention is directed to a resistance thermometer which does not possess the limitations of the thermometer described in copending application Serial No. 167,965, but which retains all of its advantages. In addition, it may be modified to make differential temperature measurements, a characteristic which is often useful and which is not possessed by my previously described thermometer.

The present application is directed to a bore hole thermometer in which a branch or branches of an alternating current bridge form the temperature measuring unit. Changes in the temperature of the temperature measuring unit changes its impedance which, in turn, changes the amount of current flowing across the bridge, and this current flowing across the bridge is rectified to direct current and used to indicate the temperature of the measuring unit.

Figure 2:
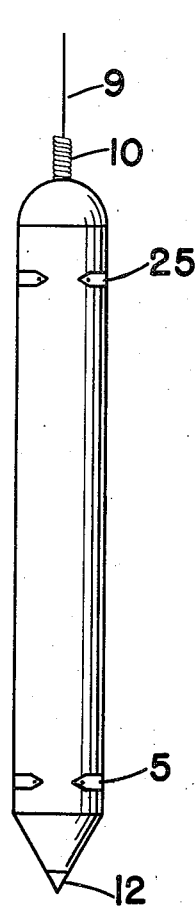
Figure 3:
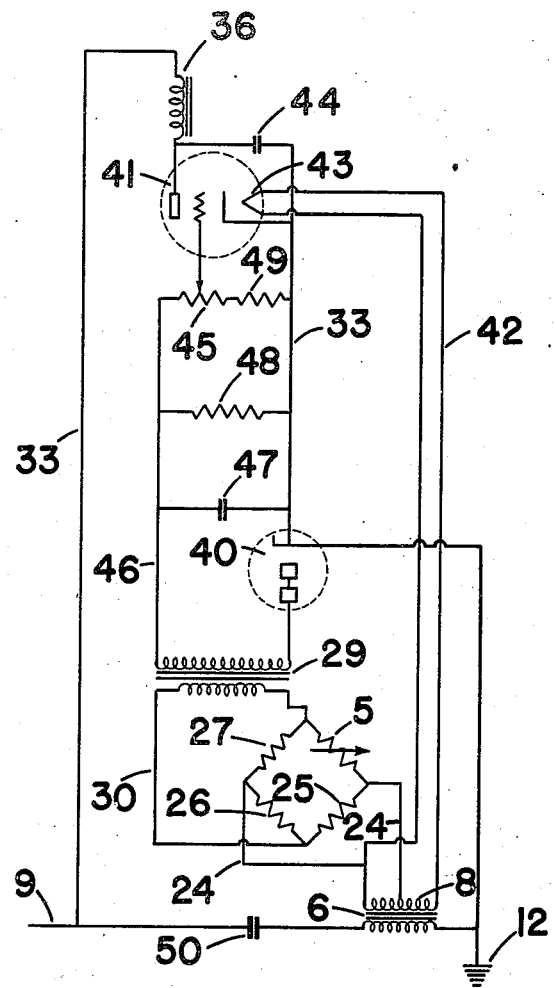

Other objects and advantages of the present invention may be seen from the following description taken in conjunction with the drawings in which Fig. 1 is a front elevation of a modification of the invention, as applied to a bore hole, with a portion of the apparatus broken away to reveal interior construction;

Fig. 2 is a front elevation of a modification of the invention in which two measuring units are exposed so that the reading obtained will be in terms of temperature variation rather than actual temperature; and Fig. 3 is a diagrammatic illustration of a circuit which may be substituted for the circuit used in the devices shown in Figs. 1 and 2.

Referring to Fig. 1 in detail, numeral 1 designates a section of the earth penetrated by bore hole 2. Within the bore hole is a casing 3 which may be of any desired form and is shown in the drawings as a cylindrical bomb composed of Bakelite or other insulating material. Arranged in circumferential groove 4 of casing 3 is a strip of metallic material 5 which may be copper, platinum, nickel or any other good conductor of heat or electricity. As shown in the drawings, this conductor is of a thickness such that the outer surface lies flush with the outer surface of casing 3. The purpose of this arrangement is to subject the exposed surface of the conductor strip to the abrasive action of the mud employed in drilling and thereby prevent the accumulation on the conductor of any chemical film which would retard the rate of heat transfer from the fluid to the element.

Supported within casing 3, in a suitable manner, is a transformer 6 having a primary winding 7 and a secondary winding 8. One end of primary winding 7 is connected to conductor 9 contained within a cable 10 while the other end of winding 7 is attached by conductor 11 to the metal electrode 12 which forms a tip for casing 3.

Cable 10 is attached to a hoisting drum 12 which enables casing 3 to be moved up and down a bore hole filled with drilling fluid 14. Electrical connection is made between conductor 9 and a conductor 15 by means of a slip ring 116. Conductor 15 connects to one end of winding 16 of transformer 17, the other end of this winding being connected to an electrode 18 which is stuck into the surface of the earth at the bore hole. The other winding 19 of transformer 17 is connected to a source of alternating current of constant frequency, such, for example, as a very constant speed generator or vacuum tube oscillator. Inserted in conductor 15 is a condenser 20 and attached to conductor 15 on either side of condenser 20 by means of leads is a resistor and voltmeter 22.

Within the casing 3 the secondary winding 8 of transformer 6 is connected to an alternating current bridge 23 by means of conductors 24. In the alternating current bridge 23 resistances 25 and 26 form one arm or branch, while resistances 5 and 27 form the other arm. Primary winding 28 of transformer 29 forms the bridge across the circuits forming the two arms or branches of the circuit, being connected across from the juncture of resistances 25 and 26 to the juncture of resistances 5 and 27 by means of conductors 30. One end of secondary winding 31 of transformer 29 is connected to conductor 11 by means of conductor 32. The other end of secondary winding 31 is connected by conductor 33 to the conductor 9 in cable 10. Inserted in conductor 33 is a rectifier 34 and resistances 35 and 36. A condenser 37 has one plate connected to conductor 32 and its other plate connected to conductor 33 between rectifier 34 and resistance 35, while a second condenser 38 has one plate connected to conductor 32 and its other plate connected to conductor 33 between resistances 35 and 36. Another condenser 39 is inserted in conductor 11 between transformer 6 and its point of connection with conductor 32. Condensers 37 and 39 and resistances 35 and 36 are inserted to serve as a filter to separate the alternating current transmitted to the device from the direct current signal.

In the modification of the invention shown by Fig. 2 the same electrical circuit is used as in Fig. 1. In this modification, however, the two resistances 5 and 25 of the alternating current bridge are exposed to the drilling fluid. This modification of the invention is used to measure changes in the temperature gradient rather than the actual temperature in the bore hole.

Fig. 3 is a diagram of an electrical circuit which may be substituted for the electrical circuit used in Fig. 1. In the modification shown in this figure, an electrical rectifier 40 and a vacuum tube 41 are used to rectify and amplify the signal produced by current flowing across the alternating current bridge. As will be seen from this diagram, secondary winding 8 of transformer 6 is connected not only to electrical bridge 23, but also by leads 42 to the filament 43 of vacuum tube 41 in order to produce the power for operating the vacuum tube.

It will be seen that, when using electrical rectifier 40 and vacuum tube 41 in the circuit, it is necessary to use condensers and resistances in a somewhat different manner in order to obtain optimum results than they are used in the modification shown by Fig. 1. In Fig. 3 the conductor 33 which connects one lead of the secondary of transformer 29 to conductor 9 contains a condenser 44, choke coil 36 and rectifier 40 and, in addition, is connected to the plate of vacuum tube 41 at a point between the condenser and the choke coil. The other lead of the secondary of transformer 29 is connected through variable resistance 45 to the grid of vacuum tube 41 by conductor 46. Across conductors 32 and 46 is connected condenser 47, resistance 48 and resistance 49. In cable 9 between its junction with conductor 33 and transformer 6 is placed condenser 50.

In the modification shown by Fig. 1 as the casing 3 is lowered into a bore hole filled with fluid, the impedance of metallic strip 5 changes as the temperature of the fluid in the bore hole changes. This change in impedance causes the balance of electrical bridge 23 to change and so causes a variation in the amount of direct current sent through the rectifier and up the cable 10. In operating this device, I prefer to adjust the resistances composing electrical bridge 23 so that the resistance of unit 5 is slightly greater than that of unit 26 producing a slight unbalance of the bridge. The temperature increases as the device is lowered in the bore hole, causes the bridge to become increasingly unbalanced and the direct current signal to become increasingly great.

In the modification shown in Fig. 2 the resistance 5 forms one arm of the alternating current bridge, while resistance 25 forms the other arm. Since both of these resistances are constructed of the same material and with substantially the same dimensions, as the temperature of the bore hole gradually increases, the impedance of both of these resistances will increase together and the changes will tend to cancel out each other. However, if there is a sudden variation of temperature in the bore hole, the temperature of strip 5 will be different from that of strip 25, causing the balance of the bridge to change which, in turn, causes the direct current which produces the temperature signal also to change. By the use of this arrangement only variations in the temperature from the general temperature gradient of the bore hole will be observed. The device shown in Fig. 2 is particularly valuable in logging wells because it is not so much the actual temperature of the hole that is desired, but the points in the hole where there are noticeable temperature variations.

The device shown in Fig. 3 may be substituted for the measuring circuit used in either Figs. 1 or 2. By the use of a vacuum tube, rectifier and amplifier better results are obtained than with the use of the copper oxide rectifier generally used in the circuit shown in Figs. 1 and 2. While in Fig. 3 only resistance 5 is shown as a variable resistance as in Fig. 1, it is apparent that both resistances 5 and 25 may be variable as shown by the modification in Fig. 2.

While I have described preferred modifications of my invention, it will be obvious to a skilled worker that changes in the device may be made. For example, instead of exposing only resistance 5 of alternating current bridge 23 in Fig. 1, I may expose both resistances 5 and 26 to the temperature of the fluid in the bore hole. By exposing both of these resistances the sensitivity of the thermometer is increased somewhat because the temperature variations will be cumulative when these resistances are exposed. It is also apparent that other changes in the arrangements of parts may be made without departing from the invention.

The nature and objects of the invention having been thus described and illustrated, what is claimed as new and useful and is desired to be secured by Letters Patent is:

1. An electrical circuit adapted to be lowered into a bore hole filled with a drilling fluid at the end of a conductor cable and including a conductive element exposed to the fluid in the bore hole and adapted to respond to temperature changes in said fluid, means for supplying alternating current to said conductive element and means for converting the changes in said alternating current due to changes in the temperature of said exposed conductive element into direct current voltages whereby the latter may be transmitted to the surface by the same means which carries the alternating current from the surface.

2. A device for measuring temperature variations in a fluid in a bore hole comprising a bomb-like casing attached to the end of a cable adapted to raise and lower said casing in the bore hole, an electrical bridge in said casing comprising four arms, each containing a resistance, one of said resistances being a conductive element exposed to the fluid in the bore hole and responsive to temperature changes in said fluid, a first and second transformer having primary and secondary windings, electrical connections between the secondary of the first transformer and two opposite junctions of said electrical bridge, electrical connections between the primary of the second transformer and two other junctions of said electrical bridge, a conductor carried by said cable for supplying alternating current to the primary of the first transformer, a second conductor including a rectifier connecting the secondary of the second transformer to said first conductor, a condenser in said first conductor between the point of connection of said second conductor therewith and the primary of said first transformer, a source of alternating current connected to said first conductor, and means for measuring the rectified current and adapted to be located at the top of said bore hole connected to said first conductor.

3. A device according to claim 2 in which the resistances of two arms of said bridge are arranged for direct heat exchange with the fluid in the bore hole.

4. A device according to claim 2 in which the resistances of two opposite arms of said bridge are arranged for direct heat exchange with the fluid in the bore hole.

5. An electrical circuit adapted to be lowered into a borehole filled with a drilling fluid at the end of a conductor cable and including a first conductor carried by said cable, an electrical bridge comprising four arms, each containing an impedance, one of said impedances being a conductive element exposed to the fluid in the borehole and responsive to temperature changes in said fluid, means including said first conductor for supplying alternating current to two opposite junctions of said bridge, means for rectifying alternating current into direct current electrically connected to the other two junctions of said bridge, and means including said first conductor for transmitting the rectified current from said rectifier to the surface.

6. A device for measuring temperature variations in a fluid in a borehole, comprising a bomb-like casing attached to the end of a cable adapted to raise and lower said casing in the borehole, a first conductor carried by the said cable, an electrical bridge in said casing comprising four arms, each containing an impedance, one of said impedances being a conductive element exposed to the fluid in the borehole and responsive to temperature changes in said fluid, means including said first conductor for supplying alternating current across two opposite junctions of said electrical bridge, a rectifier, means electrically connected to the other two junctions of said bridge arranged to supply alternating current to said rectifier, means arranged to conduct rectified current from said rectifier to said first conductor, and means for measuring the rectified current and adapted to be located at the top of said borehole connected to said first conductor.

WHITMAN D. MOUNCE.